(12) United States Patent
Meuninck et al.

(10) Patent No.: US 9,215,513 B2
(45) Date of Patent: *Dec. 15, 2015

(54) METHOD AND APPARATUS FOR PRESENTING DYNAMIC MEDIA CONTENT

(71) Applicant: AT&T Intellectual Property I, LP, Atlanta, GA (US)

(72) Inventors: Troy C. Meuninck, Newnan, GA (US); Oleg Kashapov, Alpharetta, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/460,468

(22) Filed: Aug. 15, 2014

(65) Prior Publication Data

US 2014/0359666 A1    Dec. 4, 2014

Related U.S. Application Data

(63) Continuation of application No. 12/421,834, filed on Apr. 10, 2009, now Pat. No. 8,843,975.

(51) Int. Cl.
| | |
|---|---|
| H04N 7/173 | (2011.01) |
| H04N 21/845 | (2011.01) |
| H04N 21/258 | (2011.01) |
| H04N 21/4147 | (2011.01) |
| H04N 21/433 | (2011.01) |
| H04N 21/63 | (2011.01) |
| H04N 21/472 | (2011.01) |
| H04N 21/643 | (2011.01) |

(52) U.S. Cl.
CPC ....... *H04N 21/8455* (2013.01); *H04N 7/17318* (2013.01); *H04N 21/25891* (2013.01); *H04N 21/4147* (2013.01); *H04N 21/4332* (2013.01); *H04N 21/4333* (2013.01); *H04N 21/472* (2013.01); *H04N 21/632* (2013.01); *H04N 21/64322* (2013.01)

(58) Field of Classification Search
None
See application file for complete search history.

(56) References Cited

U.S. PATENT DOCUMENTS

| | | | |
|---|---|---|---|
| 2002/0170068 A1 | 11/2002 | Rafey et al. | |
| 2002/0199181 A1 | 12/2002 | Allen | |

(Continued)

OTHER PUBLICATIONS

"FiOS TV Central", www36.verizon.com/fiostv/web/unprotected/mediamanager.aspx, Apr. 2, 2009, 2 pages.

(Continued)

*Primary Examiner* — Fernando Alcon
(74) *Attorney, Agent, or Firm* — Guntin & Gust, PLC; Jay H. Anderson

(57) ABSTRACT

A system that incorporates teachings of the present disclosure may include, for example, a set top box (STB) comprising a controller to analyze scheduled media content with limited temporal accessibility provided by a content provider, select a portion of the media content based on the analysis of the media content and a recipient media device to receive the portion of the media content, transmit the portion of the media content to a DVR to store the portion of the media content, and transmit a metadata pointer associated with the portion of the media content to a server. A request to accept the portion of the media content is received by the recipient media device via the server, and the portion of the media content is retrieved from the DVR by the server based on the metadata pointer when the recipient media device accepts the request. Other embodiments are disclosed.

20 Claims, 6 Drawing Sheets

(56) References Cited

U.S. PATENT DOCUMENTS

| | | |
|---|---|---|
| 2003/0009766 A1 | 1/2003 | Marolda |
| 2003/0070182 A1 | 4/2003 | Pierre et al. |
| 2005/0066365 A1 | 3/2005 | Rambo |
| 2006/0090187 A1 | 4/2006 | Chae |
| 2006/0107297 A1 | 5/2006 | Toyama et al. |
| 2006/0174277 A1 | 8/2006 | Sezan |
| 2006/0271961 A1 | 11/2006 | Jacoby et al. |
| 2008/0016205 A1 | 1/2008 | Svendsen |
| 2008/0244681 A1 | 10/2008 | Gossweiler |
| 2009/0049118 A1 | 2/2009 | Stevens |

OTHER PUBLICATIONS

"Welcome to ZipClip", FAQ, Apr. 2, 2009, 17 pages.

METHOD AND APPARATUS FOR PRESENTING DYNAMIC MEDIA CONTENT

CROSS-REFERENCE TO RELATED APPLICATION(S)

This application is a continuation of U.S. patent application Ser. No. 12/421,834 filed Apr. 10, 2009, which is incorporated herein by reference in its entirety.

FIELD OF THE DISCLOSURE

The present disclosure relates generally to the presentation of media content and more specifically to a method and apparatus for presenting dynamic media content.

BACKGROUND

The Internet and other networks provide users with a means for experiencing and sharing various types of media content. The media content can often include audio content, video content, text content, still image content, and/or combinations thereof. Other media content providing sources can include Internet Protocol Television (IPTV), cable TV, and satellite TV. Users of these and other media content sources can search these sources for desired content. Often times, the content can be static content, which can be readily accessible by a user, or dynamic content, which can be scheduled content that can be temporary in nature.

DETAILED DESCRIPTION

Figure 1:
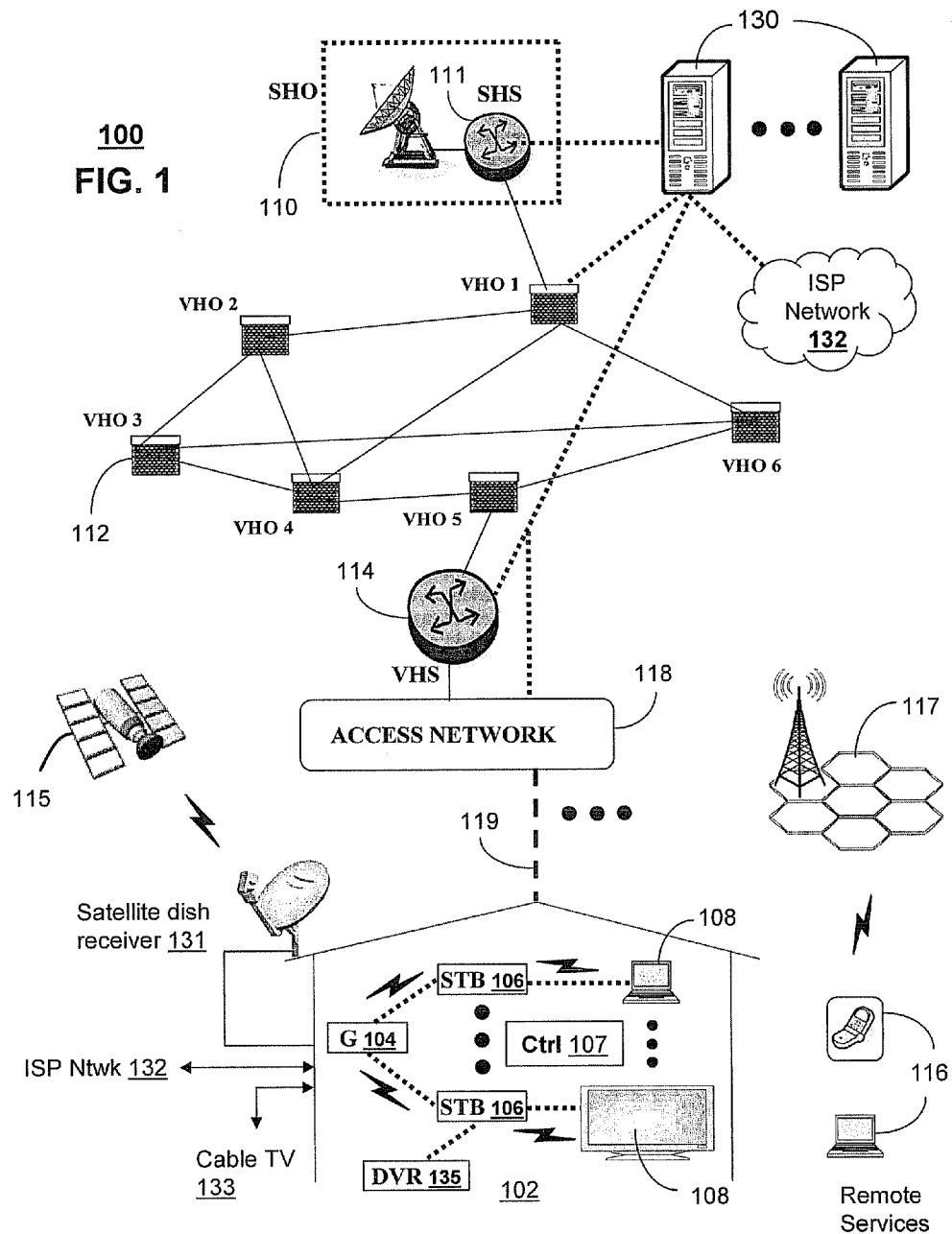
FIGS. 1-2 depict illustrative embodiments of communication systems that provide media services.

One embodiment of the present disclosure can entail a method including selecting at least a portion of media content and at least one recipient media device to receive the portion of the media content, transmitting the portion of the media content to a Digital Video Recorder (DVR), wherein the DVR stores the portion of the media content, and transmitting a metadata pointer associated with the portion of the media content to a server, wherein a request to accept the portion of the media content is received by the at least one recipient media device, and wherein the metadata pointer is stored at the server and the portion of the media content is retrieved by the server from the DVR based on the metadata pointer when the at least one recipient media device accepts the request.

Another embodiment of the present disclosure can entail a set-top-box (STB) comprising a controller to analyze media content provided by a media content provider, wherein the media content is scheduled content with limited temporal accessibility, select at least a portion of the media content and at least one recipient media device to receive the portion of the media content, the selection of the portion of the media content being based on the analysis of the media content, transmit the portion of the media content to a DVR, wherein the DVR stores the portion of the media content, and transmit a metadata pointer associated with the portion of the media content stored in the DVR to a server, wherein a request to accept the portion of the media content is received by the at least one recipient media device via the server, and wherein the portion of the media content is retrieved from the DVR by the server based on the metadata pointer when the at least one recipient media device accepts the request.

Yet another embodiment of the present disclosure can entail a recipient communications device (RCD) comprising a controller to receive a request from an initiating communications device (ICD) to accept media content selected by the ICD, wherein the media content is stored on a DVR operably coupled to the ICD upon selection by the ICD, transmit an acceptance in response to the request to a server operably coupled to the ICD, wherein a metadata pointer associated with the media content is stored on the server upon receiving the acceptance, and receive the media content from the server, wherein the server retrieves the media content from the DVR based on the metadata pointer.

Yet another embodiment of the present disclosure can entail a network element comprising a controller to receive a metadata pointer associated with media content from an ICD when the media content is selected by the ICD for transmission to a RCD, retrieve the media content from a DVR operably coupled to the ICD based on the metadata pointer when the RCD provides an acceptance for the media content, and transmit the retrieved media content to the RCD.

Yet another embodiment of the present disclosure can entail a computer-readable storage medium comprising computer instructions to receive media content from an ICD when the media content is selected by the ICD for transmission to a RCD, store the received media content, and receive a signal from a server to transmit the stored media content when the server receives an acceptance to a request for the media content from the RCD, wherein the media content is located by the server based on a metadata pointer associated with the media content.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a Digital Video Recorder (DVR) 135. The DVR 135 can be operably coupled to at least one of the STBs 106 and can be either a standalone device or integrated as part of a STB 106. Notably, the DVR 135 can be utilized to capture and store various types of media content to a disk/hard drive contained in the DVR 135. The media content can include audio content, text content, video content, still image content, and/or combinations thereof. A user can select content listed or otherwise displayed on media device 108 for transmission to another device of the user and/or to another device associated with another user. When the content is selected by the user, the STB 106 can store the selected content into the DVR 135 in preparation for transmission to the other device.

Another distinct portion of the computing devices 130 can function as a backend server (herein referred to as server 130). The server 130 can use common computing and communication technology to perform the function of distributing media content and/or other content among users utilizing the first communication system 100. Notably, the server 130 can be operably coupled to the DVR 135 and the STBs 106 via access network 118. Additionally, the server 130 can be configured to receive metadata pointers from the STBs 106 pointing to data stored in the DVR 136 and/or the STBs 106.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
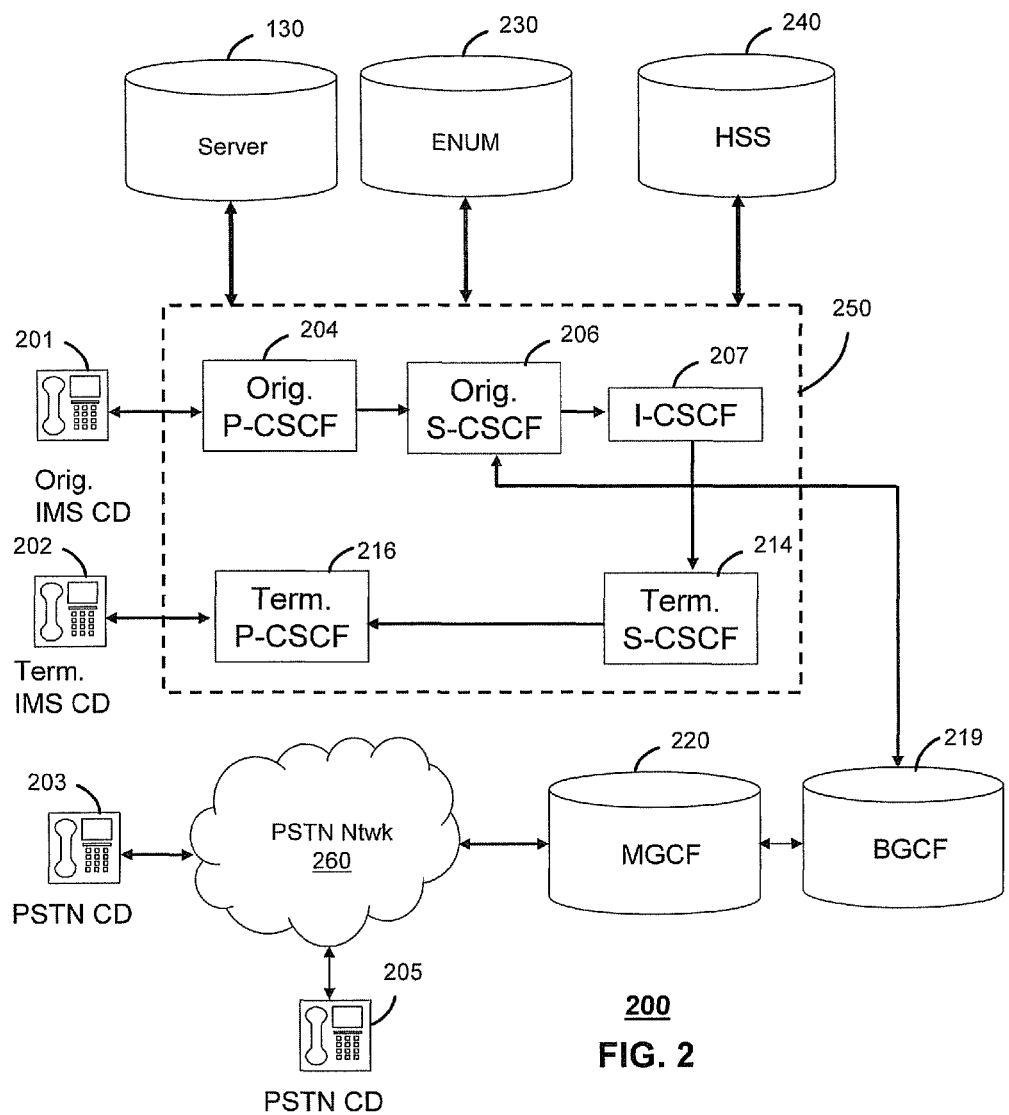

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
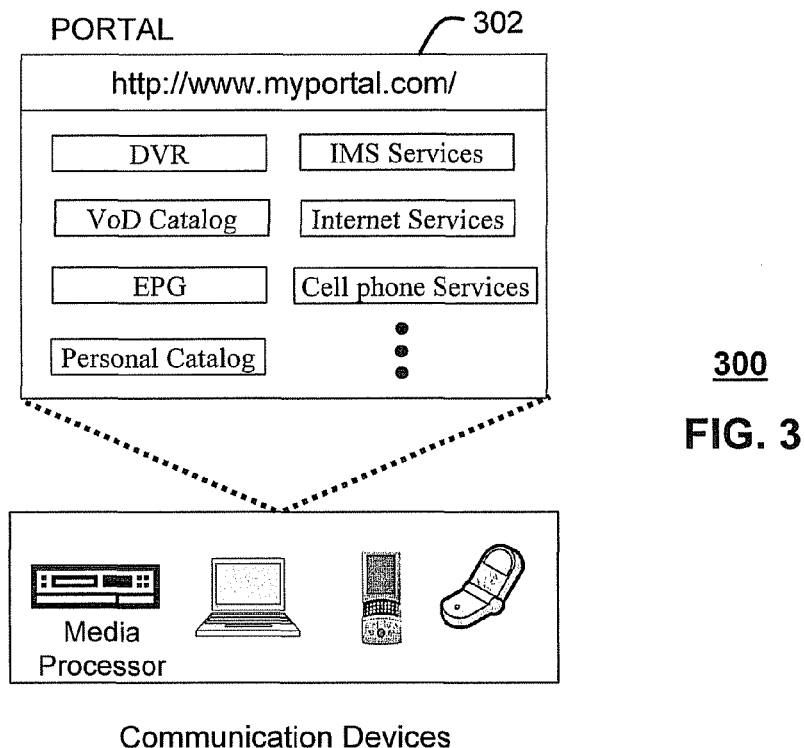
FIG. 3 depicts an illustrative embodiment of a portal interacting with the communication systems of FIGS. 1-2.

FIG. 3 depicts an illustrative embodiment of a portal 302 which can operate from the computing devices 130 described earlier in communication system 100 illustrated in FIG. 1. The portal 302 can be used for managing services of communication systems 100-200. The portal 302 can be accessed by a Uniform Resource Locator (URL) with a common Internet browser such as Microsoft's Internet ExplorerTM using an Internet-capable communication device such as those described for FIGS. 1-2. The portal 302 can be configured, for example, to access a media processor 106 and services managed thereby such as a DVR, a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
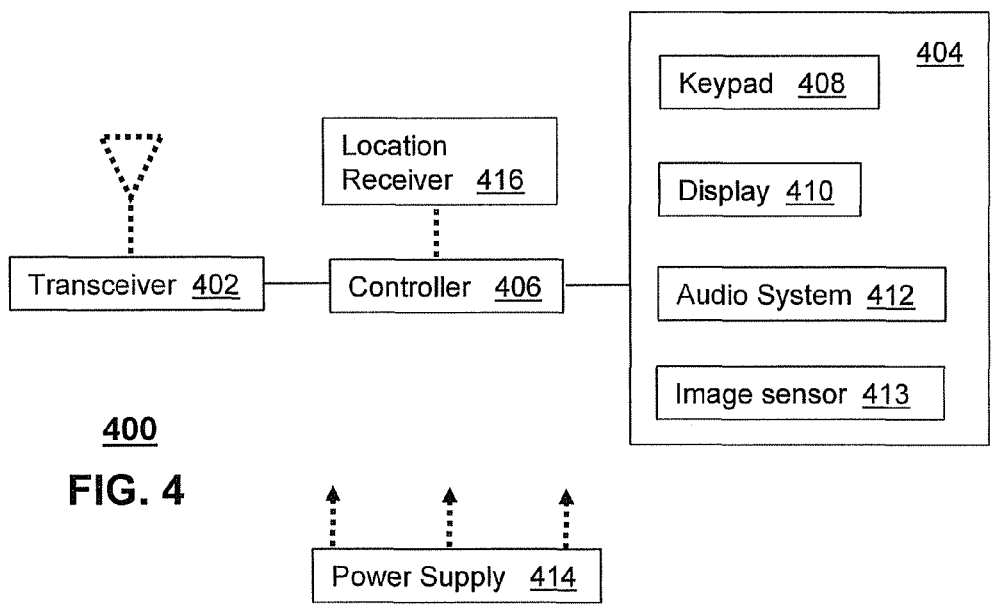
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
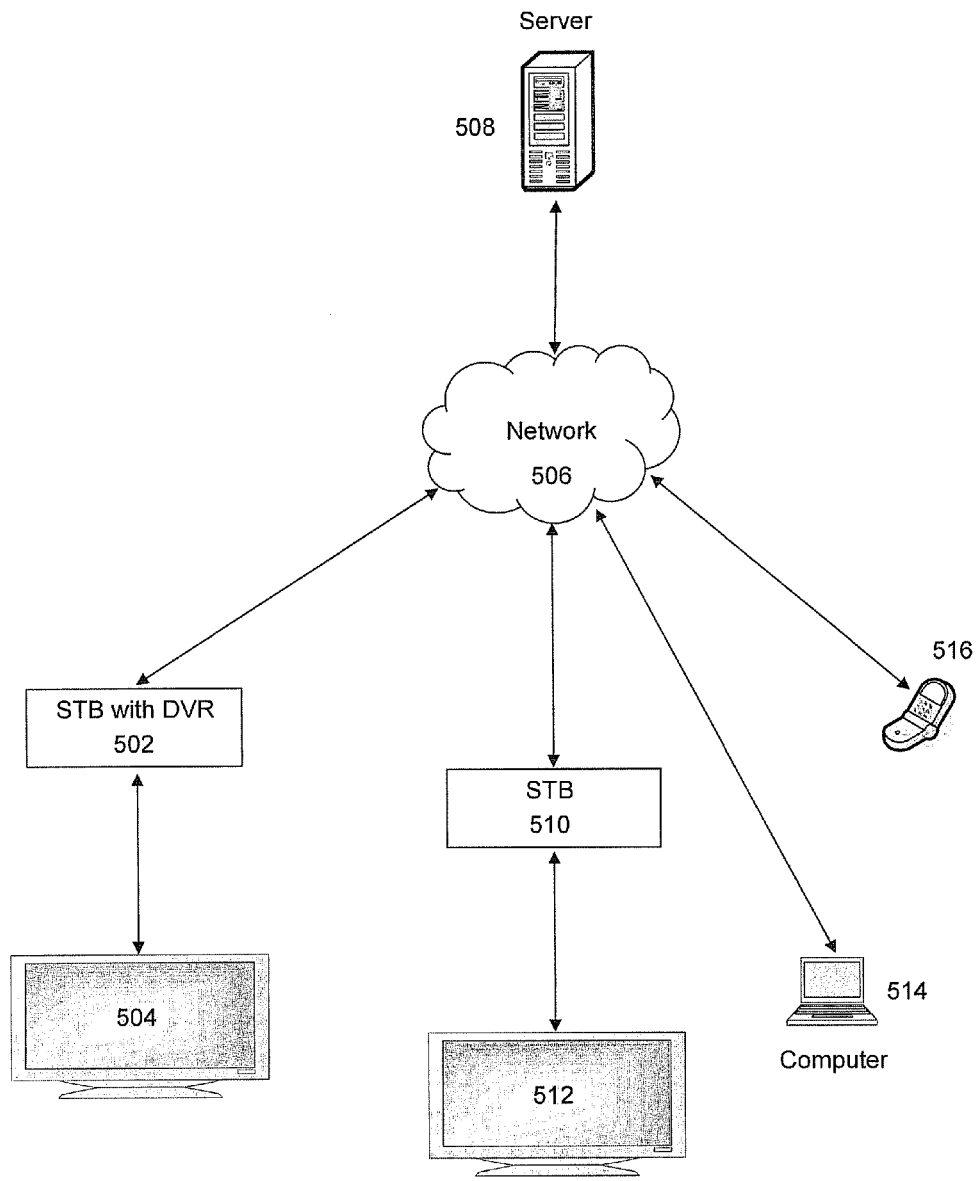
FIG. 5 depicts an illustrative embodiment of an system for presenting dynamic media content, the system operating in portions of the communication systems of FIGS. 1-2.

FIG. 5 depicts an illustrative embodiment of a system 500 for presenting dynamic media content, the system operable in portions of the communication systems of FIGS. 1-2. The system 500 can include a STB 502, which can include an integrated DVR. However, the DVR need not be an integrated device, and can instead be a standalone device, which can be operably coupled to the STB 502. The STB 502 can be operably coupled to a display device 504, which can be utilized to display various types of media content supplied to the STB 502 by a media content provider (not explicitly shown). Notably, the media content supplied by the media content provider can include audio content, text content, video content, still image content, and/or combinations thereof.

The STB 502 can be operably coupled to a network 506, which can enable the STB 502 to access a server 508. The server 508 can act as an intermediary between the STB 502 and the other devices in the system 500. Additionally, the system 500 can include a STB 510, which can be operably coupled to a display device 512. The system 500 can also include a computing device 514 and a mobile device 516. These additional devices can be operably coupled to STB 502 via the network 506. The display devices 504 and 512 can include monitors, televisions, and other means for displaying media content. Also, the computing device 514 can include computers, laptops, tablet computers, personal digital assistants (PDA), and other computing devices. The mobile device 516 can include a cellular phone, PDA, mobile computer, or other mobile device. Notably, the devices in the system 500 can be configured to operate in an interactive television (iTV) network, which can include IPTV, interactive cable television, and interactive satellite television.

A user utilizing STB 502 can select content to be transmitted to STB 510, computing device 514, and/or mobile device 516. The user can specify which recipient device or devices are to receive the content. Once the user selects content, the selected content can be stored in the DVR and a metadata pointer associated with the selected content can be transmitted by the STB 502 to the server 508. The metadata pointer can correspond to a file name associated with the portion of the selected media content, a location in the DVR, a uniform resource locator (URL), a uniform resource identifier (URI), and/or another identifier utilized for locating the selected media content. The server 508 can send a request to the specified recipient devices to accept the selected content. If the recipient device accepts the request, the metadata pointer can be stored at the server 508 and the server 508 can retrieve the content from the DVR by utilizing the metadata pointer. Once the server has retrieved the content, the server 508 can transmit the content to the recipient devices, which can then present content.

Figure 6:
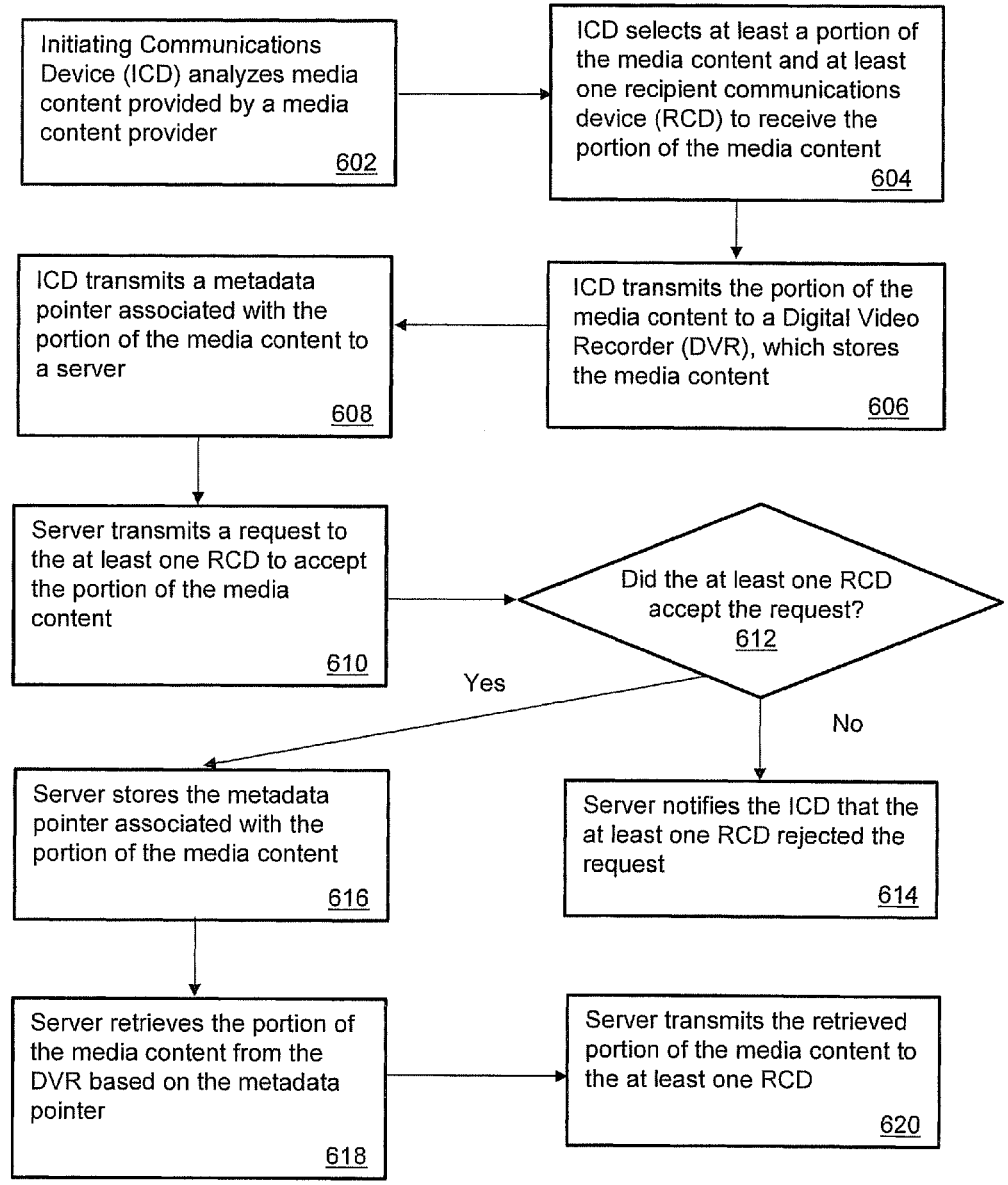
FIG. 6 depicts an illustrative embodiment of a method operating in portions of the communications systems of FIGS. 1-2 and the system of FIG. 5.

FIG. 6 depicts an illustrative method 600 that operates in portions of the communication system of FIGS. 1-2 and FIG.

5. Method 600 can begin with step 602 in which an ICD can analyze media content provided by a media content provider. The ICD can be a STB (e.g. STB 502 and STB 510), a computing device, a mobile device, another communications device, or any device in system 500. As mentioned above, the media content can include audio content, video content, still image content, text content, and a combination thereof. The media content can also be content that is dynamic in nature. Dynamic content can be content that is temporary in nature, real-time content, and/or scheduled content such as television shows, radio programs, scheduled movies, and the like. For example, a user can utilize STB 502 to browse and analyze various types of media content shown on display device 504. If the user is watching a television program that is playing in real-time, the user can search for content from the show that he would like to send to another device and/or another user.

At step 604, the ICD can select at least a portion of the media content along with one or more RCDs to receive the portion of the media content. The RCD can be STB 502, STB 510, computing device 514, and/or mobile device 516. Notably, the user can utilize STB 502 or another ICD to select the portion of the media content and to select one or more RCDs from a graphical user interface, an EPG, and/or a media on-demand interface. The RCDs can be identified and associated with the ICD based on a user profile of the ICD. Included in the user profile can be an identifier associated with each RCD stored in the user profile, an identifier associated with the ICD, account information, and any other information. The identifier associated with each RCD can correspond to a Media Access Control (MAC) address of the RCD, an Internet Protocol (IP) address of the RCD, a global unique identifier (GUID), a name associated with each RCD, and the identifier associated with the STB can correspond to at least one of a MAC address of the STB, an IP address of the STB, a GUID of the STB, and a name associated with the STB. Also, the ICD can communicate with each RCD based on the identifier associated with the RCD stored in the user profile.

Using the previous example, if the user is watching a currently playing television program and sees an image that he would like to send to his friend or to another device of the user, the user can pause the program and rewind to the point of interest where the user saw the image. The user utilize the ICD to select the image at the point of interest and can select from the user's user profile one or more RCDs to receive the image. Additionally, the user can select a media content type associated with the selected portion of the media content by using the ICD. For example, the user can be given the option of transmitting only the audio of the selected content, the video of the selected content, the text of the selected content, a portion of the content, or a combination of audio, video, and text of the selected content.

Once the ICD has selected the portion of the media content and one or more RCDs to receive the media content, the ICD can transmit the selected portion of the media content to a DVR at step 606. The DVR can be integrated into the ICD, such as in STB 502, or can be a separate device operably coupled to the ICD. The selected media content can be stored in the DVR so that the content may be retrieved by the other devices of the system 500. As the ICD selects additional content, the DVR can be configured to store the additional content and can be configured to maintain a library including all media content selected by the ICD. In the above example, the selected image from the television program can be transmitted to the DVR for storage. At step 608, the ICD can transmit a metadata pointer associated with the selected portion of media content to a server, such as server 508. The metadata pointer can correspond to a file name associated with the portion of the media content, a location in the DVR where the content is stored, a uniform resource locator (URL), a uniform resource identifier (URI), and other means for identifying and locating the selected media content.

The server 508 can then transmit a request to the one or more selected RCDs to accept the selected portion of the media content from the ICD at step 610. At step 612, the server 508 can determine whether the one or more RCDs accepted the request. If an RCD denies the request to accept the media content, the server 508 can send a signal to the ICD indicating that the RCD did not authorize delivery of the media content at step 614. However, if the RCD accepts the request from the server 508, the server 508 can be configured to then store the metadata pointer in response to the acceptance at step 616. At step 618, the server 508 can retrieve the portion of the media content from the DVR by utilizing the metadata pointer. Using the preceding example, if the RCD accepts the request to view the image selected by the user of the ICD from the television program, the server 508 can retrieve the image from the DVR so that it may be sent to the RCD. At step 620, the server 508 can transmit the retrieved portion of media content to any RCD accepting the request.

Upon reviewing the aforementioned embodiments, it would be evident to an artisan with ordinary skill in the art that said embodiments can be modified, reduced, or enhanced without departing from the scope and spirit of the claims described below. For example, in an embodiment, the RCD can receive the request from the server 508 while the RCD is presenting a media program. If the user of the RCD is watching a television program or some other content, the request can be displayed on the monitor/screen of the RCD while the program is playing. However, the RCD can also pause the currently playing media program when the RCD receives the request. If the user pauses the media program, the media content from the point of the pause can be recorded in a DVR operably coupled to the RCD.

The request from the server 508 can include a sample of the selected portion of media content so that the user of the RCD knows what the media content is or what the media content relates to. The sample of the selected portion of content can also be accompanied by text describing the content and a prompt to accept or deny the request. For example, a portion of a video clip can be sent to the RCD and the clip can be accompanied by text describing the content of the clip. If the video clip was a racing clip, the accompanying text could say, "User A wants to send you a racing clip. Please accept or deny this request." The user of the RCD can accept or deny the request by selecting graphical buttons displayed on the display of the RCD.

When the user accepts the content, the content can be overlaid on top of the currently playing media program in a manner that will enable to user of the RCD to view the accepted media content and the media program simultaneously. If the user had paused the media program, the RCD can display the accepted media content while the media program is paused. When the user is done experiencing the media content, the RCD can remove the accepted media content from the display, retrieve the media content recorded in the DVR from the point of the pause, and resume the media program from the point of the pause.

In an embodiment, the method 600 and the system 500 can be modified to perform the operative functions of the invention without the use of the server 508. The STBs 502 and 510, the computing device 512, and/or the mobile device 516 can be utilized to receive and store the metadata pointers and perform the other operative functions that the server 508 performs. In another embodiment, in the case where the ICD and the RCD belong to the same user, the RCD can be configured to automatically accept any incoming requests for media content.

Other suitable modifications can be applied to the present disclosure without departing from the scope of the claims below. Accordingly, the reader is directed to the claims section for a fuller understanding of the breadth and scope of the present disclosure.

Figure 7:
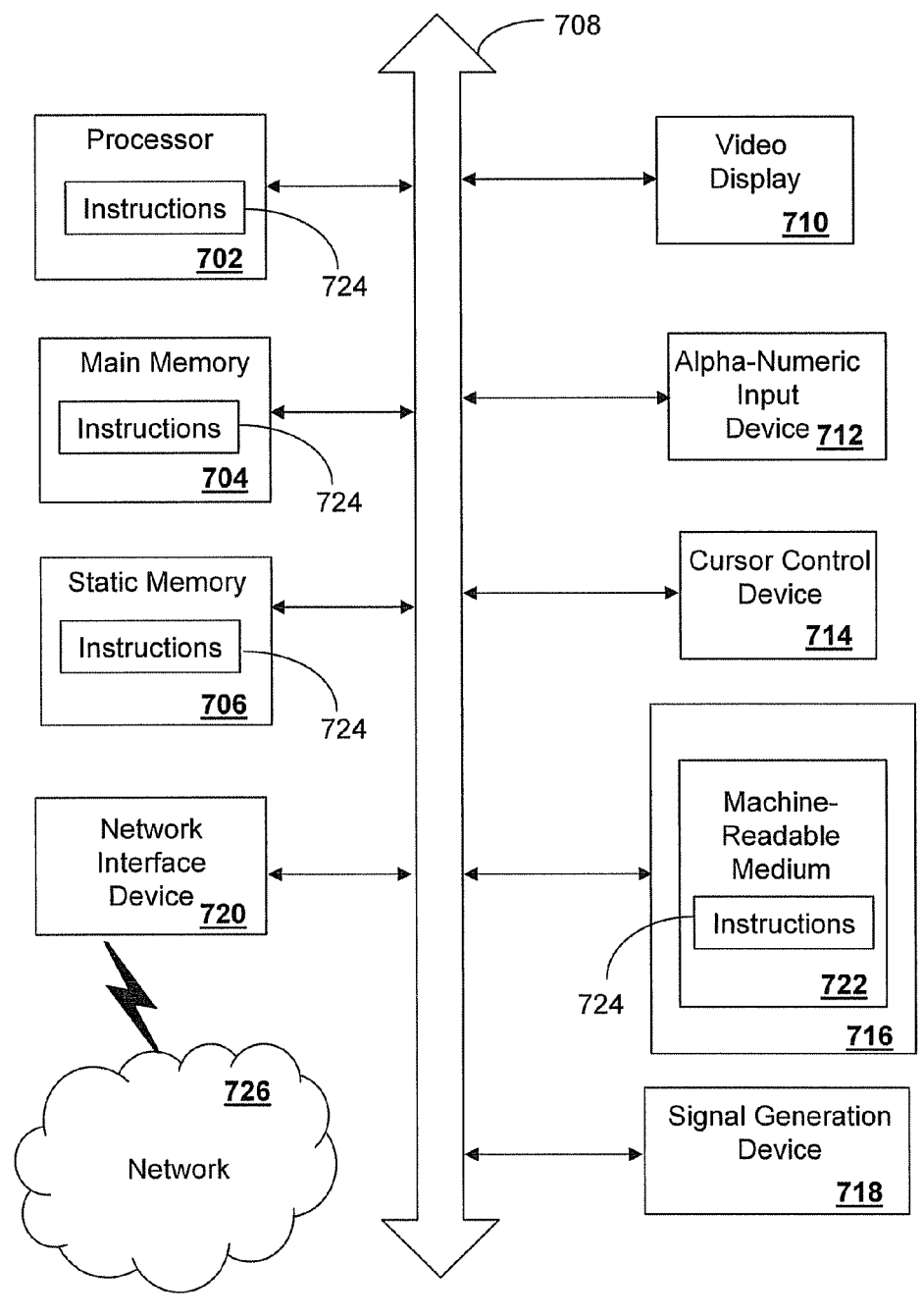
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 610 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 626 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
   a memory to store executable instructions;
   a controller coupled to the memory, wherein the controller, responsive to executing the instructions, performs operations comprising:
   receiving a metadata pointer associated with media content from an initiating device responsive to a selection of the media content and a media content type for the media content;
   transmitting a request to accept a portion of the media content to a recipient device;
   storing the metadata pointer in the memory, responsive to the recipient device accepting the request;
   retrieving the portion of the media content from a recording device operably coupled to the initiating device; and
   transmitting the portion of the media content to the recipient device.

2. The server of claim 1, wherein the operations further comprise receiving an acceptance from the recipient device in response to the request, and wherein the retrieving is performed based on the metadata pointer and responsive to receiving the acceptance.

3. The server of claim 2, wherein the storing is performed upon receiving the acceptance.

4. The server of claim 1, wherein the portion of the media content is retrieved without retrieving an entire copy of the media content.

5. The server of claim 1, wherein the selection is from a graphical user interface having options for selecting the media content type by the initiating device for transmission to the recipient device.

6. The server of claim 5, wherein the graphical user interface enables selection of text content from the media content to be sent to the recipient device.

7. The server of claim 1, wherein the operations further comprise:
   generating text to describe the media content; and
   extracting an image from the media content;
   wherein the metadata pointer includes location information indicating a location of the portion of the media content on the recording device, wherein the request to accept the media content includes the text and the image.

8. The server of claim 7, wherein the metadata pointer does not identify a file name for the media content, and wherein the metadata pointer does not indicate a uniform resource locator or uniform resource identifier for the portion of the media content.

9. The server of claim 1, wherein the request includes a sample of the portion of the media content.

10. A computer-readable storage device, comprising executable instructions which, responsive to being executed by a processor, cause the processor to perform operations comprising:
    receiving a metadata pointer associated with media content from a first communication device responsive to a selection of the media content and a media content type for the media content, the selection being from a graphical user interface having options for selecting the media content type by the first communication device for transmission to a second communication device;
    transmitting a request to accept a portion of the media content to a second communication device;
    receiving an acceptance from the second communication device in response to the request;
    storing the metadata pointer, responsive to the second communication device accepting the request;
    retrieving the portion of the media content from a recording device operably coupled to the first communication device based on the metadata pointer and responsive to receiving the acceptance; and
    transmitting the portion of the media content to the second communication device.

11. The computer-readable storage device of claim 10, wherein the storing is performed upon receiving the acceptance.

12. The computer-readable storage device of claim 10, wherein the portion of the media content is retrieved without retrieving an entire copy of the media content.

13. The computer-readable storage device of claim 10, wherein the graphical user interface enables selection of text content from the media content to be sent to the second communication device.

14. The computer-readable storage device of claim 10, wherein the operations further comprise:
    generating text to describe the media content; and
    extracting an image from the media content;
    wherein the metadata pointer includes location information indicating a location of the portion of the media content on the recording device, wherein the request to accept the media content includes the text and the image.

15. The computer-readable storage device of claim 10, wherein the request includes a sample of the portion of the media content.

16. A method comprising:
    receiving, by a server, a metadata pointer associated with media content from an initiating device responsive to a selection of the media content;
    transmitting, by the server, a request to accept a portion of the media content to a recipient device;
    storing, by the server, the metadata pointer, responsive to the recipient device accepting the request;

retrieving, by the server, the portion of the media content from a recording device operably coupled to the initiating device; and transmitting, by the server, the portion of the media content to the recipient device.

17. The method of claim 16, further comprising receiving an acceptance from the recipient device in response to the request.

18. The method of claim 17, wherein the storing is performed upon receiving the acceptance, and wherein the retrieving is performed based on the metadata pointer and responsive to receiving the acceptance.

19. The method of claim 16, wherein the selection includes a selection of a media content type for the media content.

20. The method of claim 19, wherein the selection is from a graphical user interface having options for selecting the media content type by the initiating device for transmission to the recipient device, and wherein the graphical user interface enables selection of text content from the media content to be sent to the recipient device.

* * * * *